UNITED STATES PATENT OFFICE.

FRIEDRICH RUNKEL, OF ELBERFELD, AND MARTIN HERZBERG, OF OPLADEN, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

PIGMENT-COLOR.

972,130.

Specification of Letters Patent. Patented Oct. 4, 1910.

No Drawing. Application filed June 18, 1910. Serial No. 567,695.

*To all whom it may concern:*

Be it known that we, FRIEDRICH RUNKEL and MARTIN HERZBERG, doctors of philosophy, chemists, citizens of the German Empire, residing at, respectively, Elberfeld and Opladen, near Elberfeld, Germany, have invented new and useful Improvements in Pigment-Colors, of which the following is a specification.

This invention relates to the manufacture and production of new color lakes, pigment colors, which are prepared by the usual processes known in the arts from the azo-dyestuff resulting from the combination of the diazo compound of 1-naphthylamin with 1-naphthol-5-sulfonic acid.

The new lakes are of a brilliant Bordeaux-red shade fast to light. They are insoluble in oil and an oil color, such as white lead for instance, can be painted over them without detriment to it and without the possibility of being stained by the red, a fact which is of great importance in the use of these bodies.

In order to illustrate the new process more fully the following examples are given, the parts being by weight:

Example 1: Mix intimately 100 parts of a paste containing 10 per cent. of the azo coloring matter prepared in the usual way from diazotized 1-naphthylamin and 1-naphthol-5-sulfonic acid, 200 parts of water and 100 parts of finely ground heavy spar. Remove the chief part of the water by filtration, dry the paste and grind the residue very thoroughly. A lake of a brilliant red color is thus obtained.

Example 2: Add gradually to an alkaline ($Na_2CO_3$) solution of 22.4 parts of 1-naphthol-5-sulfonic acid a solution of 12.2 parts of crystallized barium chlorid and add then slowly to the cooled mixture the diazo compound obtained from 17.9 parts of 1-naphthylamin chlorhydrate. The mixture is then stirred for about 12 hours. The new pigment color is filtered off and finished in the usual way. The preparation of pigments with other metallic oxids or salts is carried out in an analogous manner.

I claim:—

The new lake prepared from the azo dye derived from diazotized 1-naphthylamin and 1-naphthol-5-sulfonic acid, said lake being distinguished by its valuable brilliant Bordeaux-red shade and its fastness to light and oil, substantially as described.

In testimony whereof we have hereunto set our hands in the presence of two subscribing witnesses.

FRIEDRICH RUNKEL. [L. S.]
MARTIN HERZBERG. [L. S.]

Witnesses:
OTTO KÖNIG,
CHAS. J. WRIGHT.